United States Patent [19]

Haines

[11] 3,998,376
[45] Dec. 21, 1976

[54] METHOD FOR FORMING A CONNECTION BETWEEN TWO TUBES

[75] Inventor: Walter E. Haines, Bloomfield Hills, Mich.

[73] Assignee: Estan Manufacturing Company, Troy, Mich.

[22] Filed: Dec. 12, 1975

[21] Appl. No.: 639,991

[52] U.S. Cl. .................... 228/154; 29/157 T; 29/157.4; 228/141 R
[51] Int. Cl.² ............... B23K 1/04; B23K 1/12
[58] Field of Search ............ 228/153, 154, 170; 29/157 T, 157.4, 157.5; 83/54, 188

[56] References Cited
UNITED STATES PATENTS

| | | | |
|---|---|---|---|
| 1,171,899 | 2/1916 | Still | 228/153 |
| 2,067,945 | 1/1937 | Peters | 29/157.5 |
| 2,318,707 | 5/1943 | Nichols et al. | 29/157 T |
| 3,064,707 | 11/1962 | Walts | 29/157 T X |
| 3,489,045 | 1/1970 | Ray, Sr. | 83/188 |

Primary Examiner—Al Lawrence Smith
Assistant Examiner—K. J. Ramsey
Attorney, Agent, or Firm—McGlynn and Milton

[57] ABSTRACT

A method for forming a connection between two tubes or pipes is disclosed in which a depression is formed around the opening in the primary tube which receives the end of the secondary tube. A suitable solder material, such as a brazing compound, is applied to the juncture between the two tubes. When the solder material is melted, by passing the assembly through a brazing furnace for example, the molten solder pools in the depression from which it can flow into the space between the two pipes. A method for simultaneously inserting the secondary tube and forming the depression is also described.

2 Claims, 5 Drawing Figures

METHOD FOR FORMING A CONNECTION BETWEEN TWO TUBES

BACKGROUND OF THE INVENTION

This invention relates to a method of forming a connection between two tubes or pipes. The method results not only in a connection of considerable strength, but also one which is reliably sealed.

The present invention was developed primarily for the manufacture of parts used in the automotive industry. Tee connections for tubes or pipes are used in a number of applications. For example, many automobiles include a vacuum fitting which is connected to the manifold of the engine. The vacuum fitting consists of a primary tube having a plurality of secondary tubes connected to the sidewall thereof and in communication with its interior. Hoses are connected between the secondary tubes and vacuum-assisted or controlled devices such as windshield wipers, power door locks, the carburetor, and the like. By way of another example, tee-connected tubes may also be employed in the plumbing of the automobile's cooling system. In either application, it is necessary, not only to provide a strong connection between the primary and secondary tubes, but also to form a seal between the tubes having sufficient integrity to withstand the pressures encountered in service. As should be apparent, a poor connection in the vacuum fitting would result in the loss of vacuum and, consequently, poor performance of the device being assisted or controlled. In the case of the cooling system, a poor connection would cause a leak of the cooling fluid.

PRIOR ART

Heretofore, tee-connections for parts of the kind described above have been produced by punching an opening in the sidewall of the primary tube. A secondary tube is then pressed into the opening. In order to produce a strong connection and seal between the two tubes, it is common practice to braze the two tubes together. Accordingly, a suitable brazing compound is applied and the part is sent through a brazing furnace. The brazing compound melts and is expected to fill the space between the two tubes. In many cases, however, due to the shape of the primary tube, some of the molten brazing compound runs away from the site of the connection. As a result, there is not enough brazing compound at the connection to form a complete seal and a defective part results.

Due to the unreliable nature of the brazing operation it has been the general practice of manufacturers of parts of this type to leak test every part, or a large percentage of parts, to insure the integrity of the seal between the tubes. Such extensive quality control procedures are time-consuming and expensive and thus raise the costs of producing the part.

Other factors to be considered regarding the economics of manufacturing parts of this sort are the number and sequence of operations required to assemble the part. Heretofore, as suggested above, it has been the practice of manufacturers of such parts to first pierce a hole in the sidewall of the primary tube and to subsequently insert the secondary tube for connection thereto. This operation requires two distinct steps involving material handling and separate machine stations which increase the time and expense to produce the assembly.

BRIEF SUMMARY OF THE INVENTION

The instant invention provides a method of forming a connection between two tubes which produces a reliably sealed connection and thus eliminates the need for individual leak testing. Additionally, another aspect of the invention is to reduce the number of steps required to complete the connection between the two tubes. With reference to the former, a hole is pierced in the sidewall of the primary tube which is adapted to receive one end of the secondary tube. Additionally, however, a depression is formed about the opening in the sidewall of the primary tube. When a suitable soldering material is applied to the juncture between the two tubes and is subsequently melted, the molten solder material pools in the depression. As needed, the solder material flows from the depression into the space between the two tubes. In short, the depression acts as a reservoir for the molten solder material to prevent the solder material from flowing away from the juncture between the two tubes. As the solder freezes, the excess remains in the depression to further enhance the seal between the two tubes. Additionally, the instant invention provides a method by which the secondary tube is inserted into the hole in the sidewall of the primary tube substantially simultaneously during the piercing operation. The end of the secondary tube is also intended to take part in forming the depression about the opening.

Other advantages of the present invention will be readily appreciated as the same becomes better understood by reference to the following detailed description when considered in connection with the accompanying drawings wherein.

Figure 1:
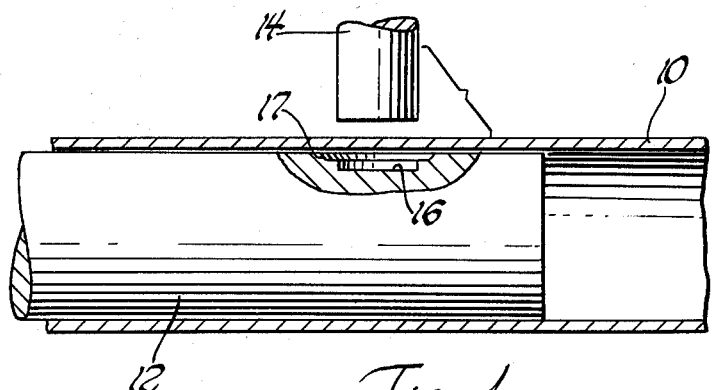
FIG. 1 is a front-elevational view, partially in cross section, showing a primary tube in position for piercing.

With reference to FIG. 1, as is common practice, one of the first steps in forming a connection between two tubes is to pierce a hole in the sidewall of the primary tube 10. In order to pierce the hole, a mandrel 12 is provided which generally supports the walls of the tube 10 during the punching operation. A punch 14 is employed to pierce the sidewall of the tube 10. A bore 16 is formed in the mandrel 12 below the area of the sidewall to be pierced. The bore 16 has a diameter slightly greater than the diameter of the punch 14 so that the punch can move through the sidewall of the tube 10 and into the bore 16. The slug removed from the sidewall drops into the bore 16 and is removed with the mandrel 12 after the punch 14 has been withdrawn.

Figure 2:
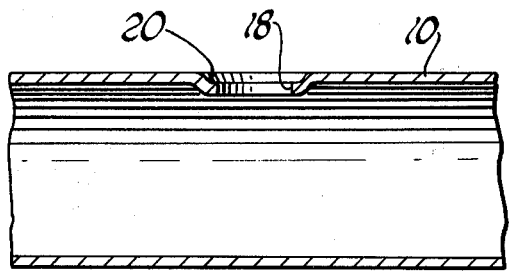
FIG. 2 is a cross-sectional, front-elevational view showing a primary tube subsequent to piercing in accordance with the instant invention.

As shown in FIG. 2, in addition to forming a hole or opening 18 in the sidewall of the tube 10, it is one aspect of the invention to form a depression 20 immediately adjacent the opening 18 having a diameter greater than the diameter of the opening 18 and sides which slope downwardly and inwardly toward the opening 18. In order to accomplish this, the bore 16 of the mandrel 12 includes an entrance 17 having a diameter somewhat greater than the diameter of the punch 14. Due to the size of the entrance 17, a portion of the sidewall of the tube 10 adjacent the area to be pierced is unsupported by the mandrel 12. Consequently, as the punch 14 engages the sidewall of the tube 10 and begins to pierce it, the unsupported region of the sidewall is deformed inwardly. Thus, the depression 20 is formed.

Figure 3:
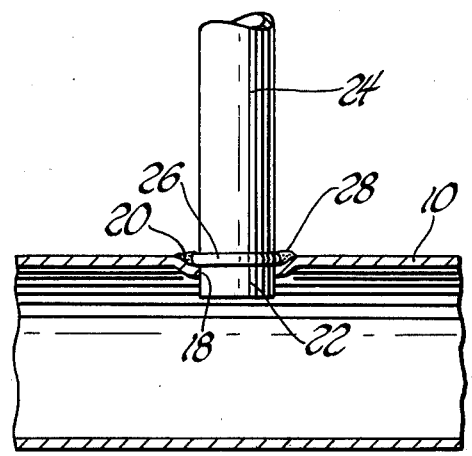
FIG. 3 is a front-elevational view, partially in cross section, showing a secondary tube connected and sealed to the primary tube.

With reference to FIG. 3, the end 22 of a secondary tube 24 is passed, or otherwise inserted, into the opening 18 in the primary tube 10. An annular rib 26 may be formed near the end 22 of the secondary tube 24. The rib 26 acts as a positioning device, or stop, to limit the amount by which the secondary tube 24 enters the opening 18 in the primary tube 10.

A suitable solder material, such as, brazing solder, is applied to the juncture between the secondary tube 24 and the opening 18 in the primary tube 10. It is noted that the brazing solders used are generally in paste form to facilitate application to the assembly. The solder material is then melted in any appropriate manner, such as, by passing the assembly through a brazing furnace. Upon melting, the molten solder material pools in the depression 20 thereby keeping it in close proximity to the juncture between the secondary tube 24 and the opening 18 in the primary tube 10. Assuming that the tubes are held in an upright position, the depression 20 prevents the molten solder material from running away from the juncture between the tubes. Thus, the depression 20 acts as a reservoir from which the molten solder material 28 can flow into the space between the two tubes. The bonding surfaces which are of particular concern in the brazing operation are the sidewall of the opening 18 and the surface of the secondary tube 24 contacted by the sidewall. Although not shown, due to the size of the space between these two surfaces, a thin layer of solder material fills this space to form a connection and seal between the tubes. Since an excess amount of molten solder material is maintained in close proximity to this juncture between the tubes, it is assured that sufficient solder will flow into the space between the tubes to form the sealed connection. An added benefit is that the excess solder material remaining in the depression freezes around the secondary tube 24 to further enhance the sealed connection.

Employing the method described above, parts have been produced which consistently conform to specification. For example, with regard to an intake manifold vacuum outlet fitting, it is necessary for the connection between the primary and secondary tubes to withstand a fifty pound tensile load. Additionally, there must be no air bubbles indicating a leak at the joint between the tubes in a fifteen second period when the fitting assembly is immersed in water with 15 psi air pressure applied. Since virtually all of the assemblies constructed in accordance with the method described above pass these specifications, part-by-part leak testing can be eliminated without risking supplyiing defective parts.

Figure 4:
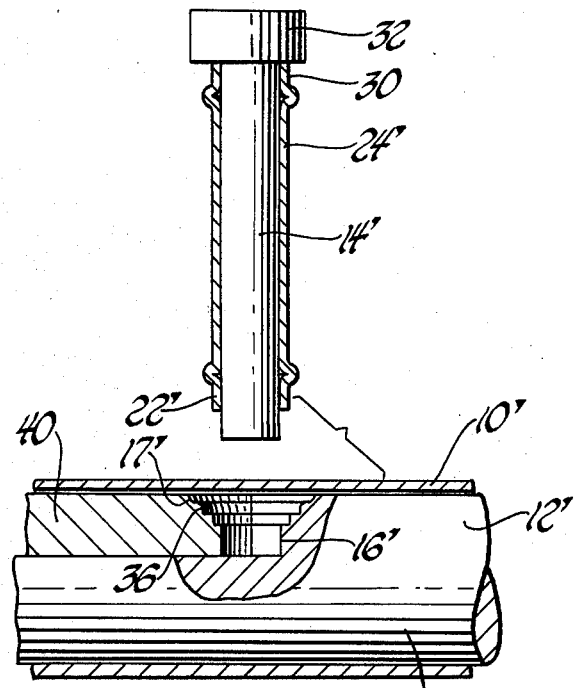
FIG. 4 is a front-elevational view, partially in cross section, showing a modification of the method of the instant invention.
Figure 5:
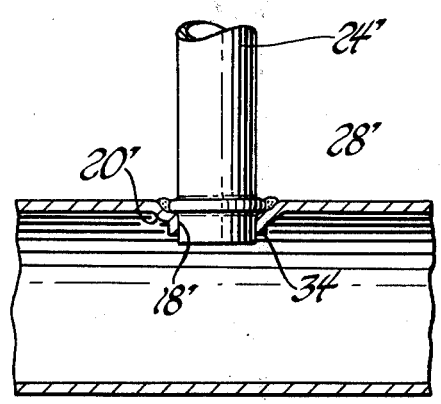
FIG. 5 is a front-elevational view, partially in cross section, showing the connection between a secondary tube and a primary tube resulting from the modified method.

A modified form of the invention is shown in FIGS. 4 and 5. In order to reduce the number of steps required to connect the two tubes, it has been discovered that the secondary tube can be inserted substantially simultaneously with the piercing of the opening in the primary tube. In the modified method of the instant invention a primary tube 10' is placed on a mandrel 12'. The secondary tube 24' is positioned on the punch 14' such that its upper end 30 abuts a stop 32. The punch 14' pierces an opening in the sidewall of the primary tube 10' and is moved into the opening to bring the lower end 22' of the secondary tube 24' into engagement with the unsupported edge of the opening. The punch 14' is then moved further into the opening. As this occurs, the end 22' of the secondary tube 24' continues the deformation of the sidewall around the opening and is eventually forced through the opening. In other words, the secondary tube 24' actually functions as a portion of the punch to deform the sidewall of the primary tube 10'. The punch 14' is then withdrawn from the secondary tube 24' leaving the secondary tube 24' in the opening.

In some cases it is desirable to increase the surface of contact between the tubes. In order to accomplish this, an inwardly extending annular flange 34 is formed at the opening 18'. If such a flange is required, the use of the secondary tube 24' as part of the punch 14' is particularly advantageous. In order to form the flange 34, the bore 16' in the mandrel 12' is formed with an intermediate enlargement 36 below the entrance 18'. The mandrel 12' is also made in two sections, a main section 38 and a secondary section 40 to permit withdrawal of the mandrel 12' subsequent to the deformation of the primary tube 10'.

In operation, the punch 14' begins to pierce and deform a portion of the sidewall of the primary tube 10' inwardly. After a slug has been severed from the sidewall, the punch 14' continues to move through the thus formed opening 18' to bring the end 22' of the secondary tube 24' into engagement with the partially deformed and unsupported edge of the sidewall 10'. Further movement of the punch 14' forces the edges of the opening 18' inwardly of the primary tube 10' and against the intermediate enlargement 36 of the bore 16' to form the flange 34. While this is occurring, the unsupported sidewall over the entrance 17' is also being deformed inwardly to form the depression 20'. When the punch reaches its terminal position, the secondary tube 24' is seated in the hole 18' and in contact with the sides of the annular flange 34 as shown in FIG. 5. The punch 14' is then withdrawn and the secondary pipe 24' is left in place. Subsequently, suitable solder material is applied and the method proceeds as described above. It is noted, however, that a depression 20' is again formed which pools the molten solder material during the brazing operation.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. A method of forming a connection between two tubes comprising the steps of:

a. piercing an opening in the sidewall of a primary tube, b. deforming the edge of the opening inwardly of the tube to form a depression having a diameter greater than the diameter of the opening,
c. inserting a secondary tube into the opening in said primary tube,
d. applying a suitable solder material to the juncture between the secondary tube and opening in the primary tube,
e. melting the solder material so that it pools in the depression and fills the space between the tubes,
f. freezing the solder material to form a sealed connection between the tubes; wherein the steps of piercing, deforming and inserting the secondary tube being effected substantially simultaneously.

2. A method of forming a connection between two tubes comprising the steps of:
a. positioning a secondary tube on a punch,
b. piercing an opening in the sidewall of a primary tube with the punch,
c. moving the punch into the opening to bring the end of the secondary tube into engagement with the edge of the opening,
d. further moving the punch into the opening thereby substantially simultaneously forming a depression in the sidewall of the primary tube by inwardly deforming the edge of the opening and forcing the end of the secondary tube into the opening,
e. withdrawing the punch from the secondary tube leaving the secondary tube in the opening,
f. applying a suitable solder material to the juncture between the secondary tube and opening in the primary tube,
g. melting the solder material so that it pools in the depression and fills the space between the tubes, and
h. freezing the solder material to form a sealed connection between the tubes.

* * * * *